United States Patent
Fujino et al.

(10) Patent No.: US 8,217,898 B2
(45) Date of Patent: Jul. 10, 2012

(54) KEYBOARD AND ELECTRONIC EQUIPMENT

(75) Inventors: Masatoshi Fujino, Tokyo (JP);
 Masayoshi Koganei, Tokyo (JP);
 Yutaka Ogasawara, Saitama (JP);
 Yasushi Itoshiro, Saitama (JP);
 Kazuhito Sato, Tokyo (JP); Kazuhiko Otake, Tokyo (JP)

(73) Assignee: Sony Corporation (JP)

( * ) Notice: Subject to any disclaimer, the term of this patent is extended or adjusted under 35 U.S.C. 154(b) by 829 days.

(21) Appl. No.: 12/322,439

(22) Filed: Feb. 3, 2009

(65) Prior Publication Data

US 2009/0195507 A1  Aug. 6, 2009

(30) Foreign Application Priority Data

Feb. 6, 2008 (JP) ................ P2008-026701

(51) Int. Cl.
 *G09F 3/02* (2006.01)
 *G09G 5/00* (2006.01)
 *H05K 1/00* (2006.01)
(52) U.S. Cl. ............... 345/168; 361/679.11; 361/679.2; 400/489; 400/492; D14/331; D14/394; D14/401
(58) Field of Classification Search .............. 345/168; 361/679.11, 679.12, 679.2; D14/320, 331, D14/333, 393–394; 400/472, 489, 490, 492
 See application file for complete search history.

(56) References Cited

U.S. PATENT DOCUMENTS

| | | | | |
|---|---|---|---|---|
| 4,480,932 A | * | 11/1984 | Willcox | 400/82 |
| 5,141,343 A | * | 8/1992 | Roylance et al. | 400/472 |
| 5,439,304 A | * | 8/1995 | Phillips et al. | 400/492 |
| 5,774,384 A | * | 6/1998 | Okaya et al. | 345/169 |
| 5,870,034 A | * | 2/1999 | Wood | 341/22 |
| 5,951,178 A | * | 9/1999 | Lim | 400/472 |
| 6,092,944 A | * | 7/2000 | Butler | 400/492 |
| 6,629,794 B2 | * | 10/2003 | Cauwels | 400/492 |
| 2003/0099497 A1 | * | 5/2003 | Zhang | 400/472 |

FOREIGN PATENT DOCUMENTS

JP  2006-306689 A  11/2006

* cited by examiner

*Primary Examiner* — Nitin Patel
*Assistant Examiner* — Alecia D English
(74) *Attorney, Agent, or Firm* — Lerner, David, Littenberg, Krumholz & Mentlik, LLP

(57) ABSTRACT

A keyboard includes a plurality of key row holders each supporting a plurality of key elements constituting each of the plurality of key rows, a support shaft placed to be rotatable about an axial center and support the plurality of key row holders arranged to intersect the axial center, an engaging portion formed on a support surface of each of the plurality of key row holders for the support shaft, and an engaged portion formed spirally on a surface of the support shaft in a direction of the axial center so as to be engaged with the engaging portion of each of the plurality of key row holders, the engaged portion causing the plurality of key row holders to shift in the direction of the axial center by an engagement with the engaging portion upon rotation of the support shaft. The keyboard enables easy and accurate key pitch adjustment.

11 Claims, 11 Drawing Sheets

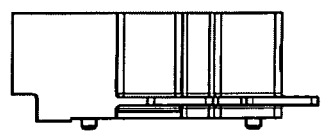
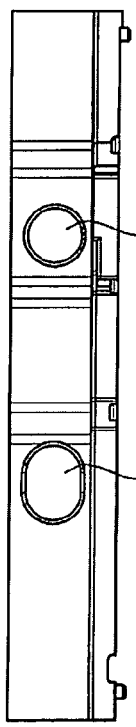
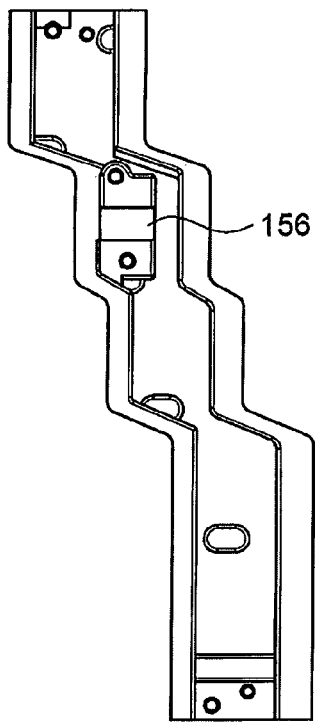
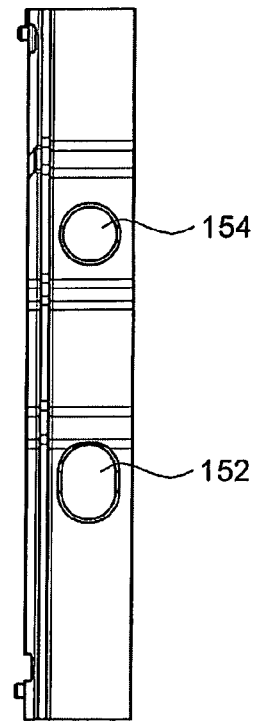
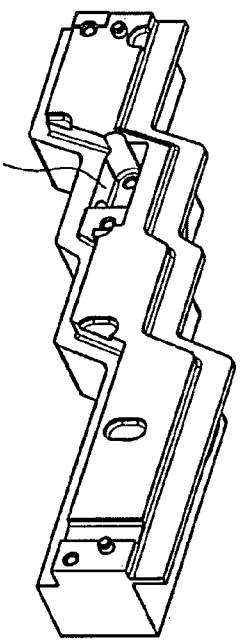
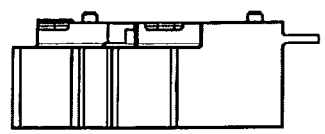

160

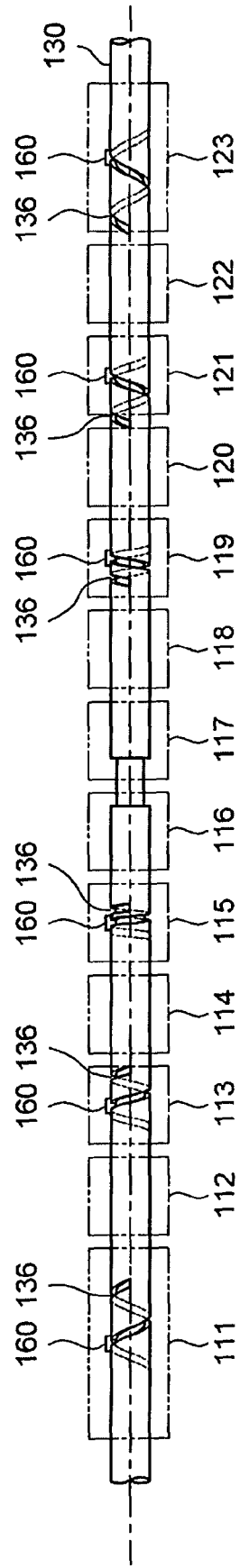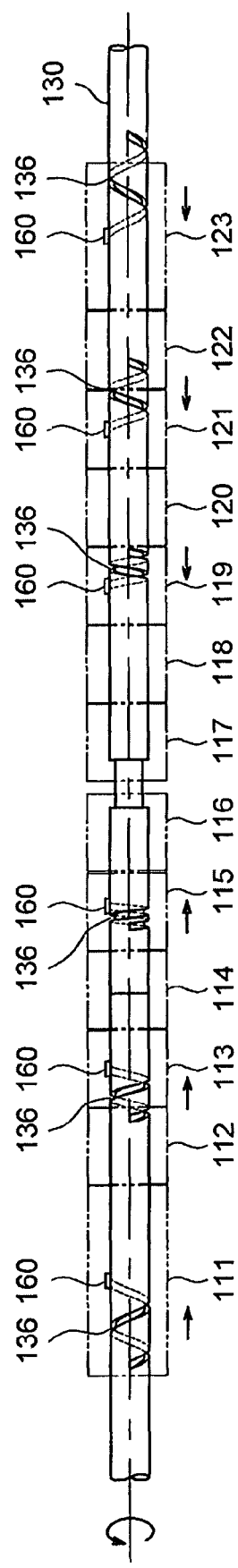
FIG.6A
FIG.6B

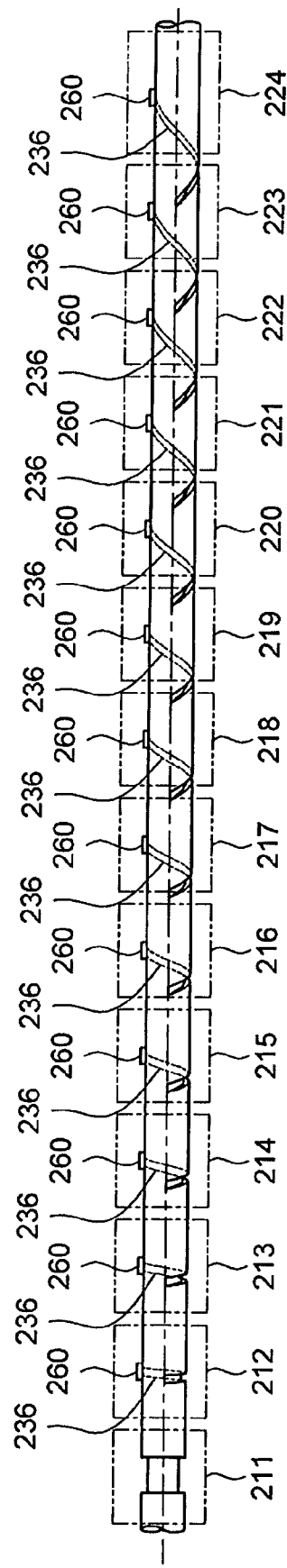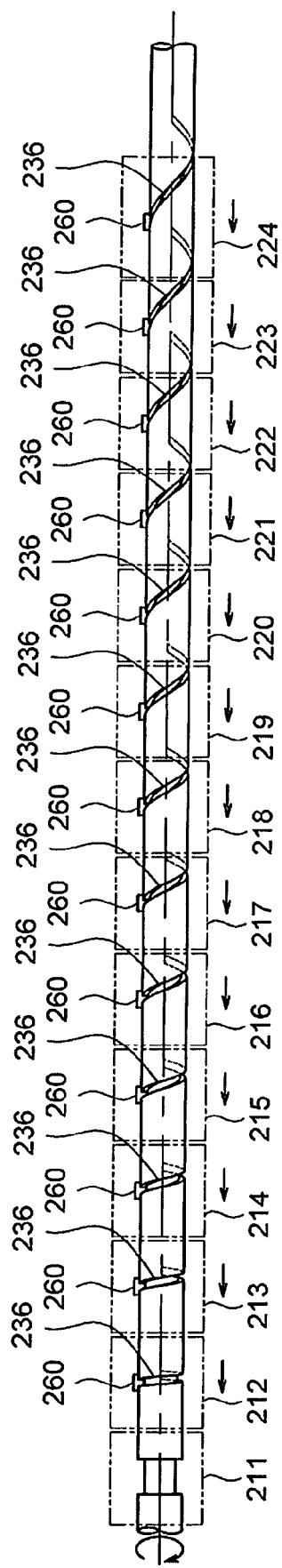

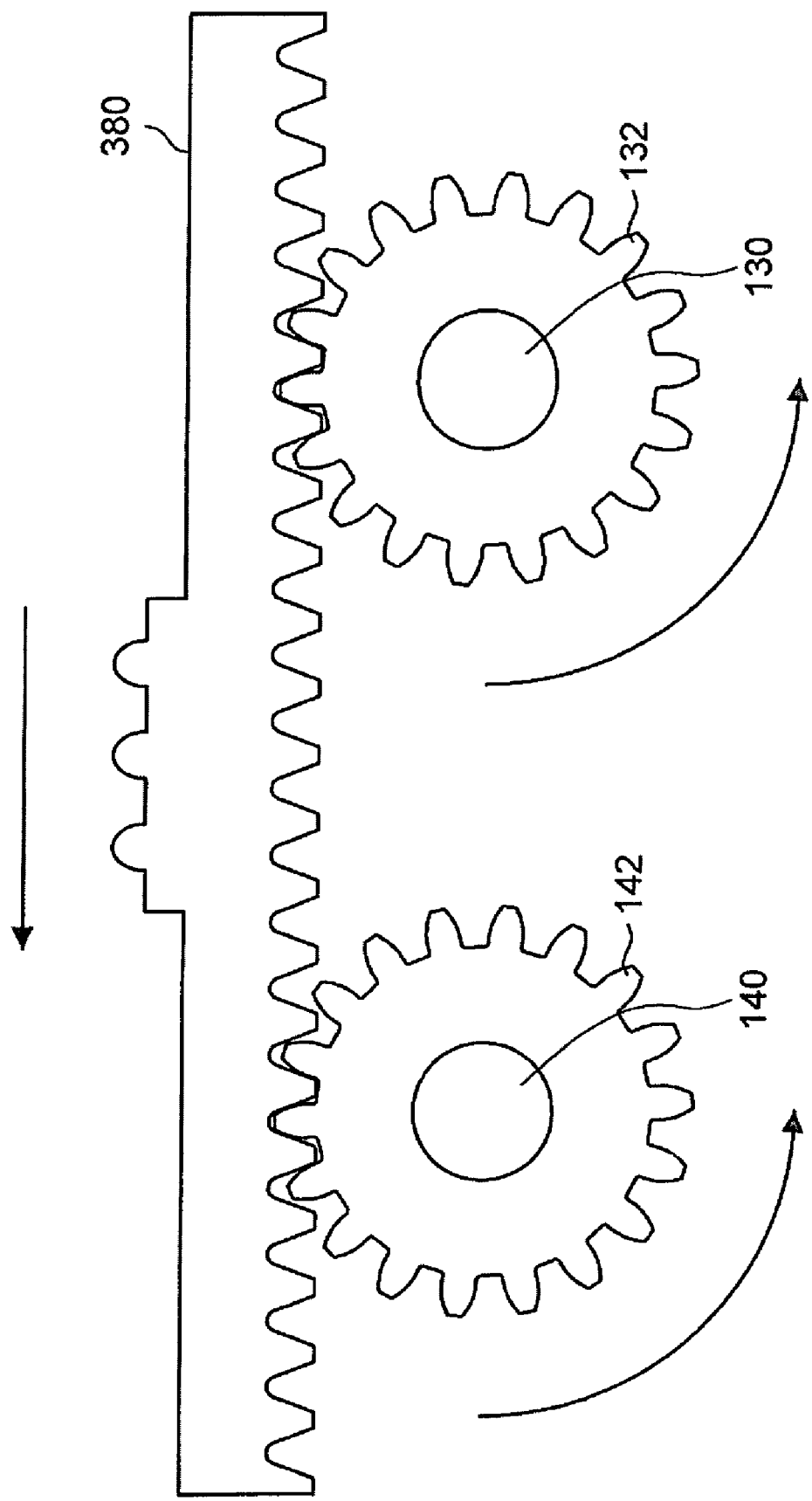

KEYBOARD AND ELECTRONIC EQUIPMENT

CROSS REFERENCES TO RELATED APPLICATIONS

The present application claims priority from Japanese Patent Application No. JP 2008-026701, filed in the Japanese Patent Office on Feb. 6, 2008, the entire content of which is incorporated herein by reference.

BACKGROUND OF THE INVENTION

1. Field of the Invention

The present invention relates to a keyboard and electronic equipment.

2. Description of the Related Art

A keyboard is an information input device that is widely used in electronic equipment such as a desktop personal computer, a laptop personal computer, a personal digital assistant (PDA), an electronic notepad and a cellular phone. The keyboard includes a plurality of key elements that are arranged in an array, and a user inputs desired information to the electronic equipment by pressing the key element with a finger or the like.

Although the keyboard includes a plurality of key elements arranged at prescribed intervals, users to operate the keyboard have different shapes of hands and different habits of operation and so on. In light of this, a keyboard with the variable pitch of key elements to thereby offer optimum usability for each user has been invented.

Japanese Unexamined Patent Application Publication No. 2006-309689 discloses a variable key pitch keyboard that includes a plurality of key rows each having a plurality of integrated key elements arranged in the vertical direction of the keyboard so that the pitch of each key row is variable using a plurality of gears and a plurality of racks.

In this keyboard, a plurality of gears that are engaged with each other are placed along the central axis at the central part in the transverse direction of the keyboard, and two racks are placed from each gear to two corresponding key rows arranged with respect to the central axis as a symmetry axis. Each gear has a larger gear diameter as a distance from the central axis to a corresponding key row is longer. When a given key row shifts to the right, for example, the rack placed across the shifted key row shifts in conjunction therewith, and the gear engaged with the rack thereby rotates. In conjunction with the gear, the other corresponding rack causes the other corresponding key row to shift to the left. Further, another gear engaged with the gear rotates in conjunction therewith, causing the other rack engaged with the other gear to shift. Accordingly, when a given key row shifts, the other key row can shift with the shift amount of the key row adjusted according to a distance from the center axis.

SUMMARY OF THE INVENTION

However, in the keyboard disclosed in Japanese Unexamined Patent Application Publication No. 2006-309689, a power is transferred to the two racks at two points of contact on the gears with a phase difference of 180° in the circumferential direction of the gear in order to shift the corresponding two key rows arranged with respect to the central axis as the symmetry axis in the diametrically opposite directions. Therefore, it is necessary to place the rotation center of the gear and the two points of contact exactly on the central axis, and it is also necessary to place the racks exactly in parallel with the shift direction of the key row. This raises an issue of assembly for the positioning of the gears and the racks and a large number of parts.

Further, a power is transferred between the gears having different gear diameters in order to adjust the shift amount of the key row according to a distance from the center axis. Therefore, the rotation torque of the gear is large and an operation to shift the key row is heavy, thus raising an issue of key pitch adjustment operation. Furthermore, because a power is transferred through the plurality of gears and racks, a backlash occurs due to a allowance in the engagement between the gears and between the gear and the rack, which causes the degradation of accuracy of the shift amount of the key row, thus raising an issue of key pitch adjustment accuracy.

In light of the foregoing, it is desirable to provide a keyboard and electronic equipment capable of easily and accurately adjusting the key pitch.

According to an embodiment of the present invention, there is provided a keyboard including a plurality of key rows, a plurality of key row holders each supporting a plurality of key elements constituting each of the plurality of key rows, a support shaft placed to be rotatable about an axial center and support the plurality of key row holders arranged to intersect the axial center, an engaging portion formed on a support surface of each of the plurality of key row holders for the support shaft, and an engaged portion formed spirally on a surface of the support shaft in a direction of the axial center so as to be engaged with the engaging portion of each of the plurality of key row holders, to shift the plurality of key row holders in the direction of the axial center by an engagement with the engaging portion upon rotation of the support shaft.

The engaged portion formed on the support shaft may include a plurality of engaged portions placed in such a way that spiral inclination angles with respect to the axial center are adjusted according to a shift amount of each of the plurality of key row holders shifted concurrently in the direction of the axial center.

In this structure, the rotating motion of the support shaft is converted into the shifting motion of the key rows in the direction of the axial center of the support shaft via the engaging portion and the spiral engaged portion. Then, the spiral inclination angles are adjusted according to the shift amount of each of the key row holders shifted concurrently. It is thereby possible to implement a key pitch adjustment mechanism with a relatively simple structure including the key row holders and the support shaft. Further, because the rotating motion of the support shaft is directly converted into the shifting motion of the key row holders in the direction of the axial center, it is possible to overcome the issue of key pitch adjustment operation. Furthermore, because the shift amount of the key rows is determined by the engagement of the engaging portion with the engaged portion, it is possible to increase the key pitch adjustment accuracy.

The engaged portion formed on the support shaft may include a plurality of engaged portions placed in such a way that spiral inclination directions with respect to the axial center are diametrically opposed between an area to one end and an area to the other end from substantially a central part of the support shaft. It is thereby possible to concurrently shift the plurality of key row holders in two opposite directions along the axis of the support shaft.

The engaged portion formed on the support shaft may include a plurality of engaged portions placed in such a way that spiral inclination directions with respect to the axial center are the same. It is thereby possible to concurrently shift the plurality of key row holders in one direction along the axis of the support shaft.

The keyboard may further include a tilt restriction portion to restrict the support surface of each of the plurality of key row holders from tilting with respect to the support shaft by rotation of the support shaft. The tilt restriction portion may be another support shaft to support the plurality of key row holders together with the support shaft. Further, the tilt restriction portion may restrict the tilting by a contact between the plurality of key row holders and a housing of the keyboard. It is thereby possible to reduce a backlash that occurs in the key rows at the time of adjusting a key pitch.

Further, the engaged portion corresponding to a first key row holder may be formed on a first support shaft, the engaged portion corresponding to a second key row holder adjacent to the first key row holder may be formed on a second support shaft to support the first and the second key row holders together with the first support shaft, the tilt restriction portion corresponding to the first key row holder may be the second support shaft, and the tilt restriction portion corresponding to the second key row holder may be the first support shaft. It is thereby possible to reliably reduce a backlash that occurs in the key rows at the time of adjusting a key pitch.

The keyboard may further include an operating member to rotate the support shaft, and the support shaft may rotate by rotating operation on the operating member. It is thereby possible to reliably rotate the support shaft.

Alternatively, the keyboard may further include an operating member to rotate the support shaft, and the support shaft may rotate by sliding operation on the operating member. It is thereby possible to easily rotate the support shaft.

The keyboard may be implemented as a part of electronic equipment and, particularly, an electronic computer.

According to the embodiments of the present invention described above, it is possible to provide a keyboard and electronic equipment capable of easily and accurately adjusting the key pitch.

BRIEF DESCRIPTION OF THE DRAWINGS

FIG. 4A is an explanatory view (perspective view) showing the structure of a key row holder.

FIG. 4B is an explanatory view (plan view) showing the structure of a key row holder.

FIG. 4C is an explanatory view (front view) showing the structure of a key row holder.

FIG. 4D is an explanatory view (rear view) showing the structure of a key row holder.

FIG. 4E is an explanatory view (right side view) showing the structure of a key row holder.

FIG. 4F is an explanatory view (left side view) showing the structure of a key row holder.

FIG. 6A is an explanatory view showing key pitch adjustment motion in a keyboard (before adjustment).

FIG. 6B is an explanatory view showing key pitch adjustment motion in a keyboard (after adjustment).

FIG. 10A is an explanatory view showing key pitch adjustment motion in a keyboard (before adjustment).

FIG. 10B is an explanatory view showing key pitch adjustment motion in a keyboard (after adjustment).

FIG. 11 is an explanatory view showing a first alternative example of an operating member.

DETAILED DESCRIPTION OF THE PREFERRED EMBODIMENTS

Figure 1:
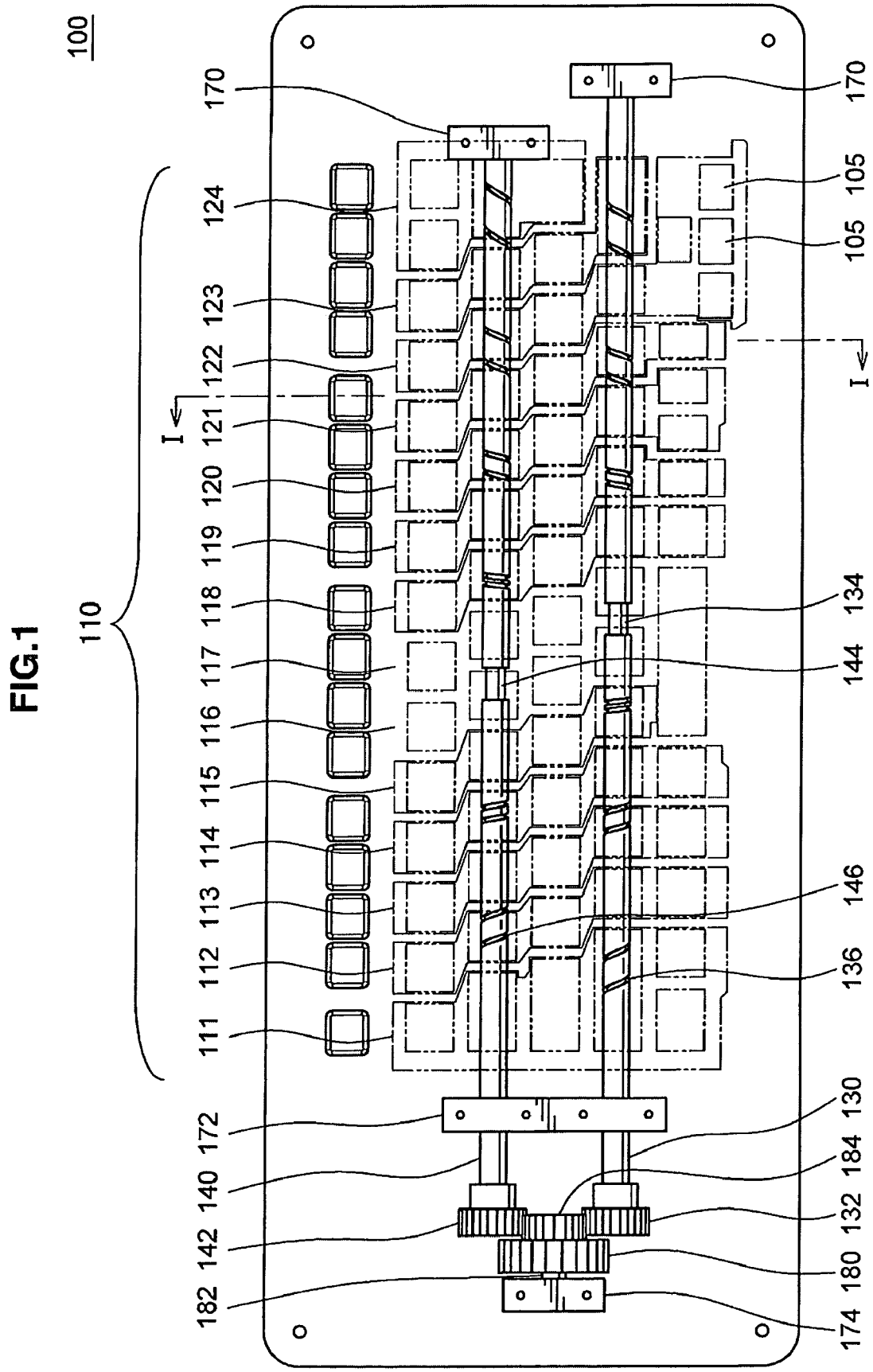
FIG. 1 is an explanatory view (plan view) showing the internal structure of a keyboard according to a first embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

First Embodiment

A first embodiment of the present invention is described hereinafter with reference to FIGS. 1 to 6. FIG. 1 is an explanatory view (plan view) showing the internal structure of a keyboard 100 according to a first embodiment of the present invention. In FIG. 1, the placement of key elements 105 and key rows 110 are indicated by reference lines so as to correspond to the internal structure.

FIG. 1 shows the keyboard 100 for a personal computer. Although the case where the present invention is applied to the keyboard 100 for a desktop personal computer is described hereinbelow, the present invention is not limited to the keyboard 100 for a personal computer. For example, the present invention may be applied equally to other electronic equipment such as a laptop personal computer, a PDA, an electronic notepad and a cellular phone.

Figure 2:
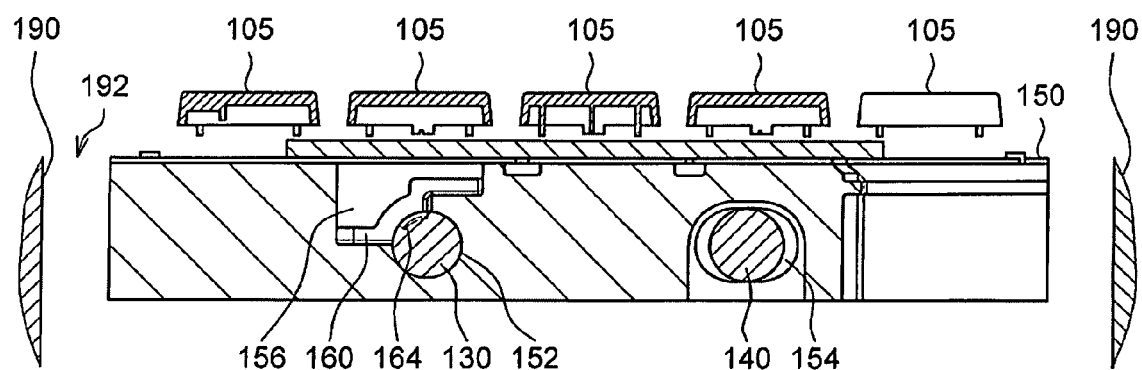
FIG. 2 is an explanatory view (sectional view) showing the internal structure of a keyboard.

The keyboard 100 has a housing 190, and a plurality of key elements 105 are arranged in the transverse direction (i.e. the horizontal direction of FIG. 1) and in the row direction (i.e. the vertical direction in FIG. 1) in an opening 192 of the housing 190 (cf. FIG. 2). In the following description, a set of key elements 105 that is composed of a plurality of key elements 105 arranged in substantially the same line is referred to collectively as the key row 110. The placement of the key elements 105 and the key rows 110 shown in FIG. 1 is given merely for describing one embodiment of the present invention, and another placement may be used instead.

Referring to FIG. 1, in the keyboard 100, the key rows 110 composed of a plurality of integrated key elements 105 and the key rows 110 composed of a plurality of non-integrated key elements 105 are placed. In the example of FIG. 1, the keyboard 100 includes the first to fourteenth key rows 111 to 124. In the first to fifth and the eighth to fourteenth key rows 111 to 115 and 118 to 124, a plurality of key elements 105 that constitute the respective key rows 110 are integrated. On the other hand, in the sixth and seventh key rows 116 and 117, a plurality of key elements 105 that constitute the respective key rows 110 are not integrated.

As shown in FIG. 1, first and second support shafts 130 and 140, to which support gears 132 and 142 are respectively fixed at one end, are placed inside the keyboard 100. The support shafts 130 and 140 are fixed to the housing 190 by support members A and B 170 and 172 so that they can rotate about the axial center. In substantially the central parts of the support shafts 130 and 140, positioning engaging portions 134 and 144 are placed respectively so as to be engaged with positioning engaged portions (not shown) placed on the housing 190. Further, engaging grooves 136 and 146 are cut on the support shafts 130 and 140, respectively, so as to correspond to each key row 110 as described in detail later.

Further, an operating shaft 182 of an operating dial 180 that functions as an operating member is placed inside the keyboard 100. The operating shaft 182 is fixed to the housing 190 by a support member C 174 so that it can rotate about the axial center. An operating gear 184 is fixed to the operating shaft 182 so that it is concurrently engaged with the support gears 132 and 142 of the first and second support shafts 130 and 140.

The support members A, B and C 170, 172 and 174 substantially restrict the shift of the support shafts 130 and 140 and the operating shaft 182 in the direction orthogonal to the axial center, and the positioning engaging portions 134 and 144 restrict the shift of the support shafts 130 and 140 in the direction of the axial center. Although the positioning engaging portions 134 and 144 are placed in substantially the central parts of the support shafts 130 and 140 in this embodiment, they may be placed in the positions different from substantially the central parts of the support shafts 130 and 140. Further, the shift of the support shafts 130 and 140 in the direction of the axial center may be restricted by the support member A 170 and/or the support member B 172 rather than placing the positioning engaging portions 134 and 144.

When the operating dial 180 is operated to rotate, the operating shaft 182 and the operating gear 184 rotate, and the first and second support shafts 130 and 140 rotate in conjunction with the rotation of the support gears 132 and 142 that are engaged with the operating gear 184. The support shafts 130 and 140 rotate about the axial center with the shift in the direction of the axial center restricted by the positioning engaging portions 134 and 144, and the shift in the direction orthogonal to the axial center restricted by the support members A and B 170 and 172.

FIG. 2 is an explanatory view (sectional view) showing the internal structure of the keyboard 100. FIG. 2 shows a cross section along line I-I of FIG. 1.

Referring to FIG. 2, the key row 110 includes a plurality of key elements 105 that constitute the key row 110, a key row holder 150 that supports the plurality of key elements 105 for each key row 110, and a key row base 160 that has a support surface 162 (cf. FIGS. 5A to 5F) to come into contact with the first or second support shaft 130 or 140 for each key row holder 150.

The key element 105 has a key top that is pressed by the finger or the like of a user who operates the keyboard 100, and it is supported by the key row holder 150 via an elastic support portion (not shown) placed on the back surface of the key top.

The key row holder 150 has a first through-hole 152 for the first support shaft 130 to penetrate, and a second through-hole 154 for the second support shaft 140 to penetrate. In the example shown in FIG. 2, the key row holder 150 is supported by the first support shaft 130 via the key row base 160 placed inside the key row holder 150 and supported by the second support shaft 140 via the second through-hole 154.

The key row base 160 has an engaging protrusion 164 to be engaged with the engaging groove 136 or 146 placed on the first or second support shaft 130 or 140, so that the key row holder 150 is supported by the first or second support shaft 130 or 140, as described in detail later. Although the key row base 160 is a separate member from the key row holder 150 in the example shown in FIG. 2, the key row base 160 may be formed as the same member as the key row holder 150.

Figure 3A:
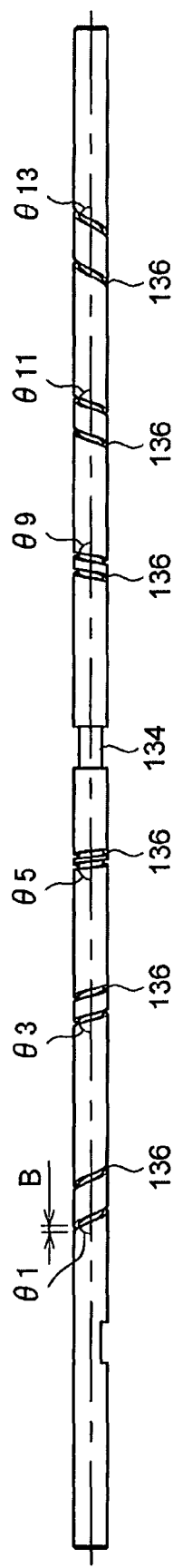
FIG. 3A is an explanatory view showing the structure of a support shaft (first support shaft).
Figure 3B:
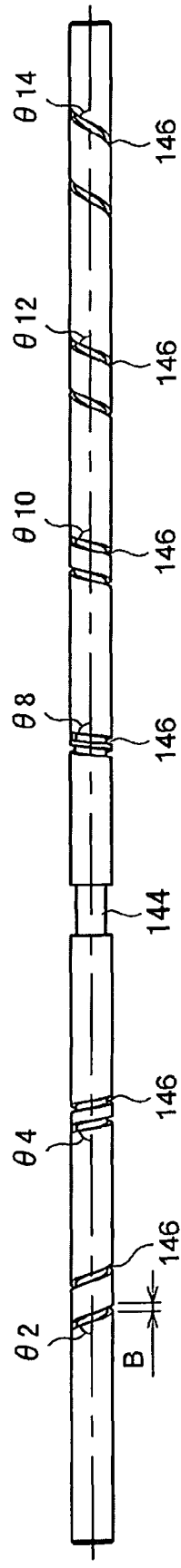
FIG. 3B is an explanatory view showing the structure of a support shaft (second support shaft).
Figure 5A:
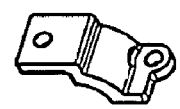
FIG. 5A is an explanatory view (perspective view) showing the structure of a key row base.
Figure 5D:
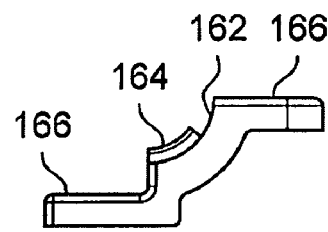
FIG. 5D is an explanatory view (rear view) showing the structure of a key row base.
Figure 5F:
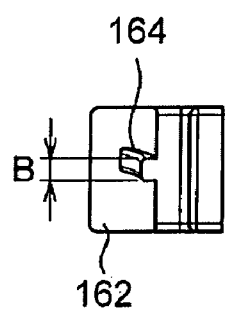
FIG. 5F is an explanatory view (left side view) showing the structure of a key row base.
Figure 5B:
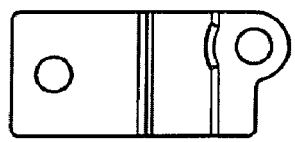
FIG. 5B is an explanatory view (plan view) showing the structure of a key row base.
Figure 5E:
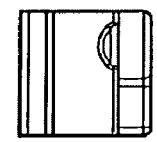
FIG. 5E is an explanatory view (right side view) showing the structure of a key row base.
Figure 5C:
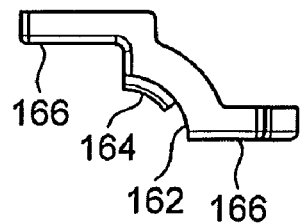
FIG. 5C is an explanatory view (front view) showing the structure of a key row base.

FIGS. 3A and 3B are explanatory views showing the structure of the support shafts 130 and 140. FIGS. 3A and 3B show plan views of the first support shaft 130 and the second support shaft 140, respectively, shown in FIG. 1.

The support shafts 130 and 140 each have a circular cross section, and the engaging grooves 136 and 146 are cut spirally in the direction of the axial center on the surfaces of the support shafts 130 and 140, respectively. In substantially the central parts of the support shafts 130 and 140, the positioning engaging portions 134 and 144 that restrict the shift of the support shafts 130 and 140 in the direction of the axial center are placed, respectively.

Referring back to FIG. 1, the first support shaft 130 has the engaging grooves 136 that correspond to the first, third, fifth, ninth, eleventh and thirteenth key rows 111, 113, 115, 119, 121 and 123, and the second support shaft 140 has the engaging grooves 146 that correspond to the second, fourth, eighth, tenth, twelfth and fourteenth key rows 112, 114, 118, 120, 122 and 124. The first and second support shafts 130 and 140 do not have engaging grooves that correspond to the sixth and seventh key rows 116 and 117.

The engaging grooves 136 and 146 have a prescribed width B, and they are cut by adjusting a spiral inclination angle $\theta$ with respect to the axial center according to a distance from substantially the central part of the support shafts 130 and 140 (to be exact, the positioning engaging portions 134 and 144). Specifically, the engaging grooves 136 and 146 are cut so that the spiral inclination angle $\theta$ with respect to the axial center is smaller (i.e. the inclination angle $\theta$ is closer to the direction of the axial center) as a distance from substantially the central part of the support shafts 130 and 140 is larger. For example, in the first support shaft 130, the spiral inclination angle $\theta$ is set to be: $\theta13<\theta1<\theta11<\theta3<\theta9<\theta5$ according to a distance from the positioning engaging portion 134.

Further, in this embodiment, the engaging grooves 136 and 146 are cut so that the spiral inclination directions with respect to the axial center are diametrically opposed between the right side area and the left side area from substantially the central part of the support shafts 130 and 140. The inclination direction indicates a direction toward either one end or the other end of the support shafts 130 and 140 regardless of the value of the inclination angle $\theta$.

FIGS. 4A to 4F are explanatory views showing the structure of the key row holder 150. FIGS. 4A to 4F show a perspective view (FIG. 4A), a plan view (FIG. 4B), a front view (FIG. 4C), a rear view (FIG. 4D), a right side view (FIG. 4E) and a left side view (FIG. 4F) of the key row holder 150.

Referring to FIGS. 4A to 4F, the key row holder 150 has a step-like shape corresponding to the placement of the key elements 105 constituting the key row 110 and placed on the top surface, and it has the first and second through-holes 152 and 154 on the side surface. The key row holder 150 has a placement hollow 156 in which the key row base 160 that is supported by the second support shaft 140, in this example, is placed. Besides, the key row holder 150 has a small opening for wiring or the like.

FIGS. 4A to 4F show the key row holder 150 that is formed for a particular key row 110, and the details of the key row holder 150 such as a shape and the position of the placement hollow 156 differ depending on the corresponding key row 110.

FIGS. 5A to 5F are explanatory views showing the structure of the key row base 160. FIGS. 5A to 5F show a perspective view (FIG. 5A), a plan view (FIG. 5B), a front view (FIG. 5C), a rear view (FIG. 5D), a right side view (FIG. 5E) and a left side view (FIG. 5F) of the key row base 160.

As shown in FIGS. 5A to 5F, the key row base 160 has the support surface 162 to come into contact with the first or second support shafts 130, 140, the engaging protrusion 164 formed on the support surface 162, and a placement surface 166 corresponding to the placement hollow 156 of the key row holder 150. The support surface 162 has a cross-sectional shape corresponding to an arc forming a part of the outline of the cross section of the support shaft 130 or 140. The engaging protrusion 164 has a width B that is substantially the same as the width of the corresponding engaging groove 136 or 146, and it is formed to be inclined with respect to the direction of the axial center of the support shafts 130 and 140 in the state where the key row base 160 is supported by the support shaft 130 or 140 so as to correspond to the spiral inclination angle θ of the corresponding engaging groove 136 or 146. The placement surface 166 comes into contact with the placement hollow 156 of the key row holder 150 so as to ensure the positioning of the key row base 160 with respect to the key row holder 150.

The key row base 160 is fixed to the key row holder 150 by a fixing means such as a screw in the state where it is placed in the placement hollow 156 of the key row holder 150. The key row base 160 shifts in the direction of the axial center of the support shafts 130 and 140 according to the rotation of the support shafts 130 and 140 by the contact of the support surface 162 with the surface of the support shaft 130 or 140 and the engagement of the engaging protrusion 164 with the engaging groove 136 or 146 of the support shaft 130 or 140, thereby allowing the key row holder 150 to shift in the direction of the axial center of the support shafts 130 and 140.

FIGS. 5A to 5F show the key row base 160 that is formed for a particular key row 110, and the details of the key row base 160 such as the shape of the engaging protrusion 164 differ depending on the corresponding key row 110.

By forming the key row base 160 as a separate member from the key row holder 150, it is possible to easily adjust the shape of the engaging protrusion 164 according to the corresponding key row 110. It is further possible to increase the accuracy of the shape of the engaging protrusion 164 so as to exactly determine the shift amount of the key row 110 that shifts in the direction of the axial center of the support shafts 130 and 140 and thereby increase the accuracy of adjusting the key pitch.

FIGS. 6A and 6B are explanatory views showing key pitch adjustment motion in the keyboard 100. FIGS. 6A and 6B show the state before the key pitch is adjusted and the state after the key pitch is adjusted, respectively. FIGS. 6A and 6B are explanatory views that conceptually show the relationship between the positional relationship of the engaging protrusion 164 of the key row base 160 with the engaging groove 136 of the support shaft 130 and the placement of the key row 110 in the first support shaft 130 shown in FIG. 1. The key pitch adjustment motion is described hereinafter with reference to FIG. 2 and FIGS. 6A and 6B.

In the state shown in FIG. 6A, the key row holders 150 of the first, third, fifth, ninth, eleventh and thirteenth key rows 111, 113, 115, 119, 121 and 123 are supported by the support shaft 130 by the contact of the support surface 162 of the key row base 160 with the surface of the support shaft 130 and the engagement of the engaging protrusion 164 with the engaging groove 136. Further, the key row holders 150 of the second, fourth, eighth, tenth and twelfth key rows 112, 114, 118, 120 and 122 are supported by the first support shaft 130 via the first through-hole 152.

Although not shown in FIGS. 6A and 6B, the key row holders 150 of the first, third, fifth, ninth, eleventh and thirteenth key rows 111, 113, 115, 119, 121 and 123 are supported also by the second support shaft 140 via the second through-hole 154. Further, the key row holders 150 of the second, fourth, eighth, tenth, twelfth and fourteenth key rows 112, 114, 118, 120, 122 and 124 are supported also by the second support shaft 140 by the contact of the support surface 162 of the key row base 160 with the surface of the support shaft 140 and the engagement of the engaging protrusion 164 with the engaging groove 146.

In the state shown in FIG. 6A, if the operating dial 180 is operated to rotate in one direction (in the counterclockwise direction when viewing the axial center from the left), it becomes the state where the key pitch is narrowed as shown in FIG. 6B. If, in the state shown in FIG. 6B, the operating dial 180 is operated to rotate in the opposite direction (in the clockwise direction when viewing the axial center from the left), it becomes the state where the key pitch is enlarged as shown in FIG. 6A. By appropriately adjusting the rotating operation of the operating dial 180, the key pitch can be adjusted freely.

As described above, when the operating dial 180 is operated to rotate, the operating shaft 182 and the operating gear 184 rotate, and the first and second support shafts 130 and 140 rotate in conjunction with the rotation of the support gears 132 and 142 that are engaged with the operating gear 184. The support shafts 130 and 140 rotate about the axial center with the shift in the direction of the axial center restricted by the positioning engaging portions 134 and 144, and the shift in the direction orthogonal to the axial center restricted by the support members A and B 170 and 172.

If the support shafts 130 and 140 rotate in the state where the shift in the direction of the axial center and the direction orthogonal to the axial center is restricted, the engagement position of the engaging groove 136 or 146 that is cut spirally in the direction of the axial center with the engaging protrusion 164 shifts, and, in conjunction with the shift of the engagement position, the key row bases 160 and the key row holders 150 of the key rows 111 to 115 and 118 to 124 other than the sixth and the seventh key rows 116 and 117 concurrently shift linearly in the direction of the axial center.

The engaging grooves 136 and 146 are cut so that the spiral inclination angle θ with respect to the axial center is smaller (i.e. it is closer to the direction of the axial center) as a distance from substantially the central parts of the support shafts 130 and 140 (to be exact, the positioning engaging portions 134 and 144) is larger. Therefore, when the support shafts 130 and 140 rotate, a distance that the engagement position of the engaging groove 136 or 146 with the engaging protrusion 164 shifts linearly in the direction of the axial center is larger in the engaging grooves 136 and 146 with the smaller spiral inclination angle θ with respect to the axial center.

Particularly, the engaging grooves 136 and 146 are cut so that the plurality of key rows 110 shift at equal key pitches according to the rotation of the support shafts 130 and 140. Specifically, the case where the engagement position of the engaging protrusion 164 with the engaging groove 136 or 146 shifts from one end to the other end of the spiral is described hereinbelow. For example, the engaging groove 136 corresponding to the fifth key row 115 that is placed close to substantially the central parts of the support shafts 130 and 140 is cut so that the key row 115 shifts by 2 mm. On the other hand, the engaging groove 136 corresponding to the first key row 111 that is placed most distant from substantially the central parts of the support shafts 130 and 140 is cut so that the key row 111 shifts by 10 mm in consideration of the shift of the first to fourth key rows 111 to 114. In this manner, it is possible to make the plurality of key rows 110 shift at equal key pitches by differentiating a shift distance of the key row 110 placed close to and a shift distance of the key row 110 placed distant from substantially the central parts of the support shafts 130 and 140, which is substantially the center of the shift of the key row 110, according to their positions.

Further, the engaging grooves 136 and 146 are cut so that the spiral inclination directions with respect to the axial center are diametrically opposed between the right side area and the left side area from substantially the central parts of the support shafts 130 and 140. Therefore, when the support shafts 130 and 140 rotate, the key rows 110 corresponding to the engaging grooves 136 and 146 in the right side area from substantially the central parts of the support shafts 130 and 140 and the key rows 110 corresponding to the engaging grooves 136 and 146 in the left side area therefrom concurrently shift linearly in the opposite directions from each other. By placing the positioning engaging portions 134 and 144 in substantially the central parts of the support shafts 130 and 140, respectively, the shift of the support shafts 130 and 140 in the direction of the axial center is restricted about substantially the central parts of the support shafts 130 and 140, thereby increasing the accuracy of adjusting the key pitch.

Furthermore, the key row holder 150 is supported by either one of the first and second support shafts 130 and 140 via the key row base 160 placed inside the key row holder 150 and further supported by the other one of the first and second support shafts 130 and 140 via the first or second through-hole 152 or 154. In the followings, it is assumed that the key row holder 150 is supported by the first support shaft 130 via the key row base 160 and supported by the second support shaft 140 via the second through-hole 154 for the convenience of description.

When the first support shaft 130 rotates, the key row holder 150 shifts linearly in the direction of the axial center by the engagement of the engaging protrusion 164 with the engaging groove 136. In this case, if a certain amount of friction occurs between the engaging protrusion 164 and the engaging groove 136, it hinders the smooth shift of the engaging protrusion 164 along the engaging groove 136, and the key row holder 150 is thereby inclined to move in a tilting manner about the axial center of the first support shaft 130 as a rotation center. However, because the key row holder 150 is supported by the second support shaft 140 via the second through-hole 154, the tilting motion of the key row holder 150 is restricted, thereby reliably reducing a backlash that occurs in the key row 110 at the time of adjusting the key pitch.

As described in the foregoing, in the keyboard according to this embodiment, it is possible to implement a key pitch adjustment mechanism with a relatively simple structure including the key row holders 150 and the support shafts 130 and 140. Further, because the rotating motion of the support shafts 130 and 140 is directly converted into the shifting motion of the key row holder 150 in the direction of the axial center, it is possible to overcome the issue of key pitch adjustment operation. Furthermore, because the shift amount of the key row 110 is determined by the engagement of the engaging protrusion 164 of the key row base 160 with the engaging groove 136 or 146, it is possible to increase the key pitch adjustment accuracy. In addition, it is possible to concurrently shift the plurality of key row holders 150 in two opposite directions along the axes of the support shafts 130 and 140.

Second Embodiment

A second embodiment of the present invention is described hereinafter with reference to FIGS. 7 to 10. For the functional structure and the way of motion that are substantially identical to those described in the first embodiment, redundant description is not provided below.

Figure 7:
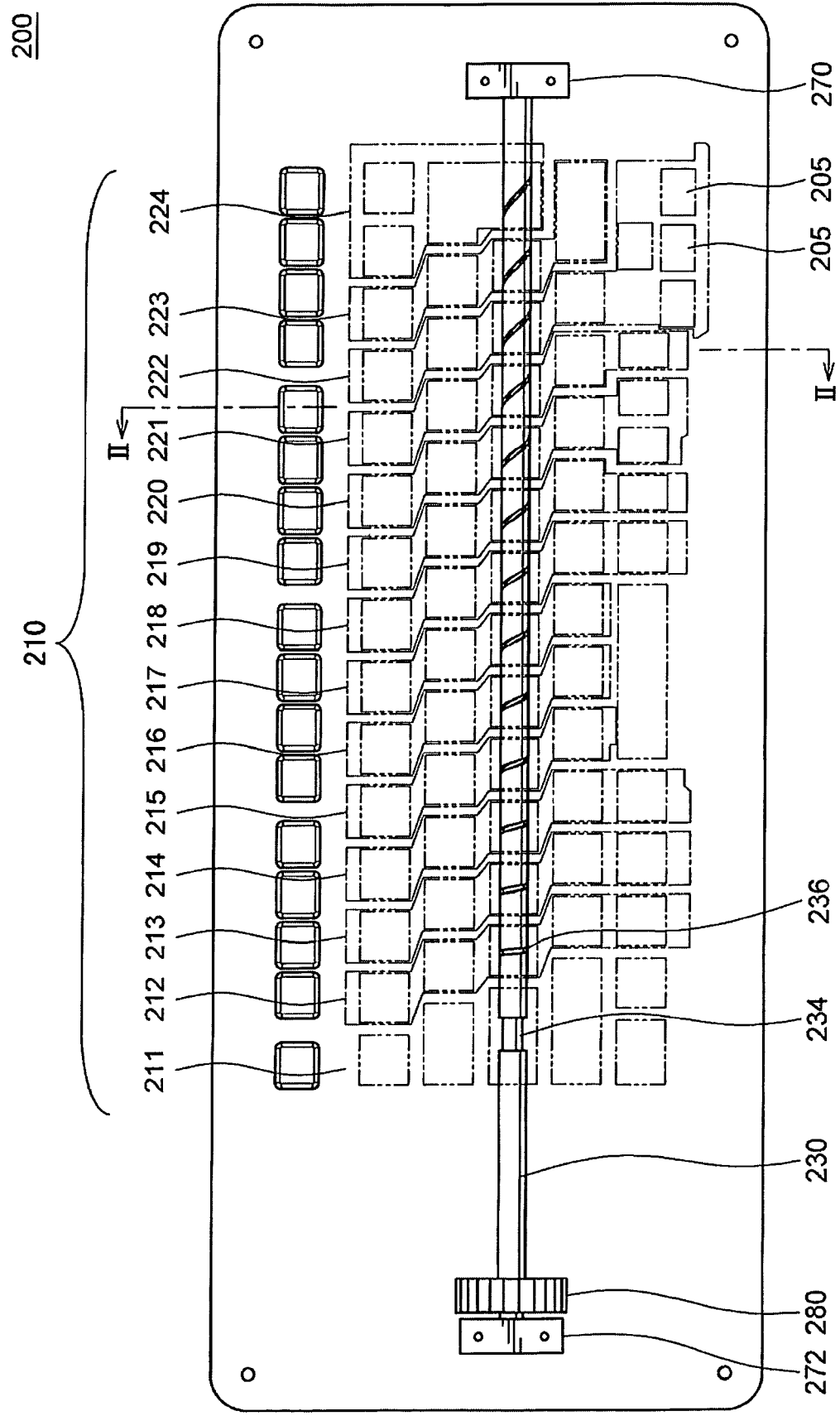
FIG. 7 is an explanatory view (plan view) showing the internal structure of a keyboard according to a second embodiment of the present invention.

FIG. 7 is an explanatory view (plan view) showing the internal structure of a keyboard 200 according to a second embodiment of the present invention. Referring to FIG. 7, the keyboard 200 includes key rows 210 composed of a plurality of integrated key elements 205 and key rows 210 composed of a plurality of non-integrated key elements 205. In the example of FIG. 7, the keyboard 200 includes the first to fourteenth key rows 211 to 224. In the second to fourteenth key rows 212 to 224, a plurality of key elements 205 that constitute the respective key rows 210 are integrated. On the other hand, in the first key row 211, a plurality of key elements 205 that constitute the key row 210 are not integrated.

As shown in FIG. 7, a support shaft 230, to which an operating dial 280 is fixed at one end, is placed inside the keyboard 200. The support shaft 230 is fixed to a housing 290 by support members A and B 270 and 272 so that it can rotate about the axial center (cf. FIG. 8). At one end of the support shaft 230 (which corresponds to the left end of the support shaft 230 shown in FIG. 7), a positioning engaging portion 234 is placed so as to be engaged with a positioning engaged portion (not shown) placed in the housing 290. Further, an engaging groove 236 is cut on the support shaft 230 so as to correspond to each key row 110 as described in detail later. The positioning engaging portion 234 may be placed on the right end of the support shaft 230.

When the operating dial 280 is operated to rotate, the support shaft 230 rotates in conjunction with the rotation of the operating dial 280. The support shaft 230 rotates about the axial center with the shift in the direction of the axial center restricted by the positioning engaging portion 234, and the shift in the direction orthogonal to the axial center restricted by the support members A and B 270 and 272.

Figure 8:
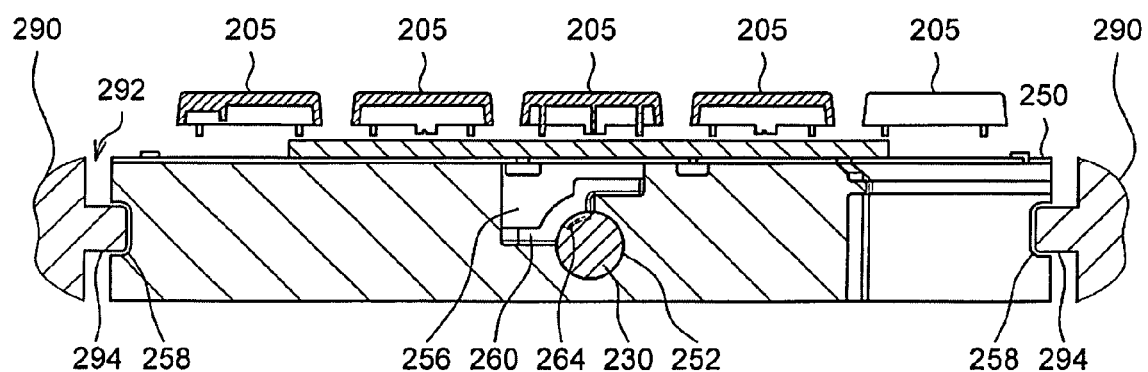
FIG. 8 is an explanatory view (sectional view) showing the internal structure of a keyboard.

FIG. 8 is an explanatory view (sectional view) showing the internal structure of the keyboard 200. FIG. 8 shows a cross section along line II-II of FIG. 7.

Referring to FIG. 8, the key row 210 includes a plurality of key elements 205 that constitute the key row 210, a key row holder 250 that supports the plurality of key elements 205 for each key row 210, and a key row base 260 that has a support surface 262 to come into contact with the support shaft 230 for each key row holder 250.

The key row holder 250 has a through-hole 252 for the support shaft 230 to penetrate. In the example shown in FIG. 8, the key row holder 250 is supported by the support shaft 230 via the key row base 260 placed inside the key row holder 250. The key row base 260 has an engaging protrusion 264 to be engaged with the engaging groove 236 placed on the support shaft 230, so that the key row holder 250 is supported by the support shaft 230, as described in detail later.

Referring to FIG. 8, as a tilt restriction portion for restricting the tilting of the key row holder 250, a tilt restriction protrusion 294 is formed on the housing 290 of the keyboard 200, and the key row holder 250 has a tilt restriction hollow 258 that comes into contact with the tilt restriction protrusion 294 upon tilting of the key row holder 250. The tilt restriction portion may be configured as a tilt restriction hollow formed on the housing 290 and a tilt restriction protrusion formed on the key row holder 250.

Figure 9:
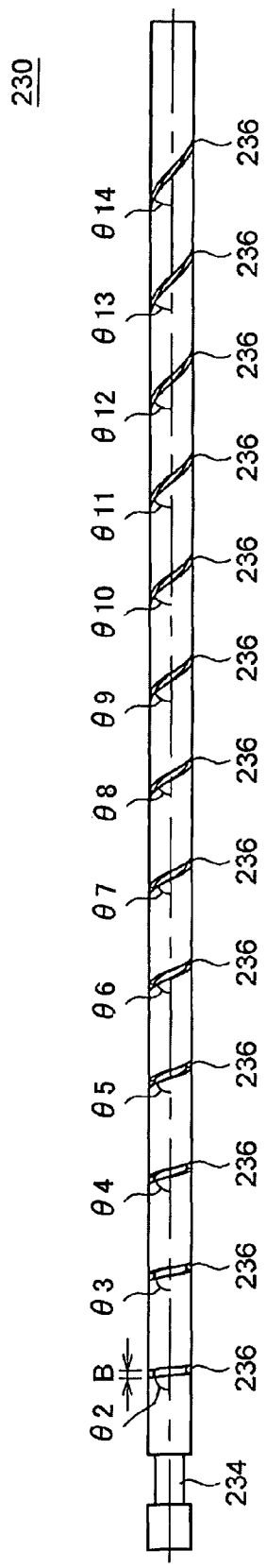
FIG. 9 is an explanatory view showing the structure of a support shaft.

FIG. 9 is an explanatory view showing the structure of the support shaft 230. FIG. 9 shows a plan view of the support shaft 230 shown in FIG. 7.

Referring back to FIG. 7, the support shaft 230 has the engaging grooves 236 that correspond to the second to fourteenth key rows 212 to 224. The engaging groove 236 does not have an engaging groove that corresponds to the first key row 211.

The engaging groove 236 is cut by adjusting a spiral inclination angle θ with respect to the axial center according to a distance from one end of the support shaft 230 (which corresponds to the left end of the support shaft 230 shown in FIG. 7). Specifically, the engaging groove 236 is cut so that the spiral inclination angle θ with respect to the axial center is smaller (i.e. it is closer to the direction of the axial center) as a distance from one end of the support shaft 230 is larger. For example, in the support shaft 230, the spiral inclination angle θ of the engaging groove 236 is set to be: θ14<θ13<θ12<θ11<θ10<θ9<θ8<θ7<θ6<θ5<θ4<θ3<θ2 according to a distance from the left end of the support shaft 230. In this embodiment, the spiral inclination direction with respect to the axial center is the same.

FIGS. 10A and 10B are explanatory views showing key pitch adjustment motion in the keyboard 200. FIGS. 10A and 10B show the state before the key pitch is adjusted and the state after the key pitch is adjusted, respectively. FIGS. 10A and 10B are explanatory views that conceptually show the relationship between the positional relationship of the engaging protrusion 264 of the key row base 260 with the engaging groove 236 of the support shaft 230 and the placement of the key row 210. The key pitch adjustment motion is described hereinafter with reference to FIG. 8 and FIGS. 10A and 10B.

In the state shown in FIG. 10A, the key row holders 250 of the second to fourteenth key rows 212 to 224 other than the first key row 211 are supported by the support shaft 230 by the contact of the support surface 262 of the key row base 260 with the surface of the support shaft 230 and the engagement of the engaging protrusion 264 with the engaging groove 236.

If, in the state shown in FIG. 10A, the operating dial 280 is operated to rotate in one direction (in the clockwise direction when viewing the axial center from the left), it becomes the state where the key pitch is narrowed as shown in FIG. 10B. If, in the state shown in FIG. 10B, the operating dial 280 is operated to rotate in the opposite direction (in the counterclockwise direction when viewing the axial center from the left), it becomes the state where the key pitch is enlarged as shown in FIG. 10A. By appropriately adjusting the rotating operation of the operating dial 280, the key pitch can be adjusted freely.

As described above, when the operating dial 280 is operated to rotate, the support shaft 230 rotates in conjunction with the rotation of the operating dial 280. The support shaft 230 rotates about the axial center with the shift in the direction of the axial center restricted by the positioning engaging portion 234, and the shift in the direction orthogonal to the axial center restricted by the support members A and B 270 and 272.

If the support shaft 230 rotates in the state where the shift in the direction of the axial center and the direction orthogonal to the axial center is restricted, the engagement position of the engaging groove 236 that is cut spirally in the direction of the axial center with the engaging protrusion 264 shifts, and, in conjunction with the shift of the engagement position, the key row bases 260 and the key row holders 250 of the second to fourteenth key rows 212 to 224 other than the first key row 211 concurrently shift linearly in the direction of the axial center.

The support shaft 230 is cut so that the spiral inclination angle θ with respect to the axial center is smaller (i.e. it is closer to the direction of the axial center) as a distance from one end of the support shaft 230 as a reference at the time of shifting is larger. Therefore, when the support shaft 230 rotates, a distance that the engagement position of the engaging groove 236 with the engaging protrusion 264 shifts linearly in the direction of the axial center is larger in the engaging groove 236 with the smaller spiral inclination angle θ with respect to the axial center.

Particularly, the engaging groove 236 is cut so that the plurality of key rows 210 shift at equal key pitches according to the rotation of the support shaft 230. Specifically, when the engagement position of the engaging protrusion 264 with the engaging groove 236 shifts from one end to the other end of the spiral, for example, the engaging groove 236 corresponding to the second key row 212 is cut so that the key row 212 shifts by 2 mm. On the other hand, the engaging groove 236 corresponding to the fourteenth key row 224 is cut so that the key row 224 shifts by 26 mm in consideration of the shift of the second to thirteenth key rows 212 to 223.

Further, the engaging groove 236 is cut so that the spiral inclination direction with respect to the axial center is the same. Thus, when the support shaft 230 rotates, the second to fourteenth key rows 212 to 224 concurrently shift linearly in the same direction.

Furthermore, the key row holder 250 is supported by the support shaft 230 via the key row base 260 placed inside the key row holder 250, and it has the tilt restriction hollow 258 that comes into contact with the tilt restriction protrusion 294 of the housing 290 upon tilting of the key row holder 250.

When the support shaft 230 rotates, the key row holder 250 shifts linearly in the direction of the axial center by the engagement of the engaging protrusion 264 with the engaging groove 236. In this case, if a certain amount of friction occurs between the engaging protrusion 264 and the engaging groove 236, it hinders the smooth shift of the engaging protrusion 264 along the engaging groove 236, and the key row holder 250 is thereby inclined to move in a tilting manner about the axial center of the support shaft 230 as a rotation center. However, because the tilt restriction protrusion 294 comes into contact with the tilt restriction hollow 258 upon tilting of the key row holder 250, the tilting motion of the key row holder 250 is restricted, thereby reducing a backlash that occurs in the key row 210 at the time of adjusting the key pitch.

The tilt restriction portion may be configured as a contacting member placed on the housing 290 or the key row holder 250 rather than configured as a combination of a protrusion and a hollow. In this case, a protrusion may be formed on an inner bottom surface of the housing 290, for example, so that the bottom surface of the key row holder 250 comes into contact with the protrusion upon tilting of the key row holder 250, thereby restricting the tilting of the key row holder 250. Further, a protrusion may be formed on the bottom surface of the key row holder 250 rather than on the inner bottom surface of the housing 290.

In the keyboard 200 according to this embodiment, it is possible to concurrently shift the plurality of key row holders 250 in one direction along the axis of the support shaft 230.

(Alternative Example of an Operating Member)

FIG. 11 is an explanatory view showing a first alternative example of an operating member. Referring to FIG. 11, in the first alternative example of an operating member, an operating rack 380 that functions as an operating member is included instead of the operating dial 180 in the first embodiment. In such a case, the operating rack 380 is placed on the top surface of the housing 190 so that it is concurrently engaged with the support gears 132 and 142 that are fixed to the first and second support shafts 130 and 140. When the operating rack 380 is operated to slide in the direction orthogonal to the axial center of the support shafts 130 and 140, the support gears 132 and 142 that are engaged with the operating rack 380 rotate, and the support shafts 130 and 140 rotate in conjunction with the rotation of the support gears 132 and 142. It is thereby possible to rotate the support shafts 130 and 140 easily by the sliding operation of the operating rack 380.

Further, as a second alternative example of an operating member, in the second embodiment, the operating dial 280 may function as a support gear corresponding to the operating gear 184, and the operating rack 380 may be used in the same manner as in the first alternative example. In this case, the operating rack 380 is placed on the top surface of the housing 290 so that it is engaged with an operating gear (the operating dial 280) fixed to the support shaft 230.

Furthermore, as a third alternative example of an operating member, the operating rack 380 may be operated to slide in the same direction as the axial center of the support shafts 130 and 140 (or 230), thereby rotating the support shafts 130 and 140 (or 230). In this case, the sliding motion of the operating rack 380 in the same direction as the axial center of the support shafts 130 and 140 (or 230) can be converted into the rotating motion of the support gears 132 and 142 (or the operating dial 280) by engaging the operating rack 380 with the support gears 132 and 142 (or the operating dial 280) via a bevel gear or the like. It is thereby possible to adjust the key pitch intuitively by the sliding operation in the same direction as the shift direction of the key row 110 (or 210).

As a fourth alternative example of an operating member, the support shafts 130 and 140 (or 230) may be controlled to rotate by motor operation using a motor mechanism or the like rather than controlled to rotate by manual operation via the operating dial 180, 280, the operating rack 380 or the like.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, in the above-described embodiments, the case where the spiral engaging grooves 136 and 146 (or 236) are cut on the support shafts 130 and 140 (or 230), and the engaging protrusion 164 (or 264) corresponding to the engaging grooves 136 and 146 (or 236) is formed on the key row base 160 (or 260) is described. However, a spiral engaging protrusion may be formed on the support shafts 130 and 140 (or 230), and an engaging groove corresponding to the engaging protrusion may be cut on the key row base 160 (or 260).

Further, in the first embodiment, the structure of the keyboard in the case of shifting a plurality of key rows concurrently in two opposite directions along the axis with use of two support shafts is described. However, the keyboard may be configured so as to shift a plurality of key rows concurrently in two opposite directions along the axis with use of one support shaft as in the second embodiment or with use of three or more support shafts. On the other hand, in the second embodiment, the structure of the keyboard in the case of shifting a plurality of key rows concurrently in one direction along the axis with use of one support shaft is described. However, the keyboard may be configured so as to shift a plurality of key rows concurrently in one direction along the axis with use of two support shafts as in the first embodiment or with use of three or more support shafts.

What is claimed is:

1. A keyboard including a plurality of key rows, comprising:
   a plurality of key row holders each supporting a plurality of key elements constituting each of the plurality of key rows;
   a support shaft placed to be rotatable about an axial center and support the plurality of key row holders arranged to intersect the axial center;
   an engaging portion formed on a support surface of each of the plurality of key row holders for the support shaft; and
   an engaged portion formed spirally on a surface of the support shaft in a direction of the axial center so as to be engaged with the engaging portion of each of the plurality of key row holders, the engaged portion causing the plurality of key row holders to shift in the direction of the axial center by an engagement with the engaging portion upon rotation of the support shaft.

2. The keyboard according to claim 1, wherein
   the support shaft includes a plurality of engaged portions placed in such a way that spiral inclination angles with respect to the axial center are adjusted according to a shift amount of each of the plurality of key row holders shifted concurrently in the direction of the axial center.

3. The keyboard according to claim 1, wherein
   the support shaft includes a plurality of engaged portions placed in such a way that spiral inclination directions with respect to the axial center are diametrically opposed between an area to one end and an area to the other end from substantially a central part of the support shaft.

4. The keyboard according to claim 1, wherein
   the support shaft includes a plurality of engaged portions placed in such a way that spiral inclination directions with respect to the axial center are the same.

5. The keyboard according to claim 1, further comprising:
   a tilt restriction portion to restrict the support surface of each of the plurality of key row holders from tilting with respect to the support shaft by rotation of the support shaft.

6. The keyboard according to claim 5, wherein
   the tilt restriction portion is another support shaft to support the plurality of key row holders together with the support shaft.

7. The keyboard according to claim 5, wherein
   the engaged portion corresponding to a first key row holder is formed on a first support shaft,
   the engaged portion corresponding to a second key row holder adjacent to the first key row holder is formed on a second support shaft to support the first and the second key row holders together with the first support shaft,
   the tilt restriction portion corresponding to the first key row holder is the second support shaft, and
   the tilt restriction portion corresponding to the second key row holder is the first support shaft.

8. The keyboard according to claim 5, comprising:
   a housing to surround the plurality of key rows, and the tilt restriction portion restricts the tilting of the key row holders by a contact between the plurality of key row holders and the housing.

9. The keyboard according to claim 1, further comprising: an operating member to rotate the support shaft, wherein the support shaft rotates by rotating operation on the operating member.

10. The keyboard according to claim 1, further comprising: an operating member to rotate the support shaft, wherein the support shaft rotates by sliding operation on the operating member.

11. Electronic equipment comprising a keyboard having a plurality of key rows, the keyboard including:
   a plurality of key row holders, each supporting a plurality of key elements constituting each of the plurality of key rows;
   a support shaft placed to be rotatable about an axial center and support the plurality of key row holders arranged to intersect the axial center;
   an engaging portion formed on a support surface of each of the plurality of key row holders for the support shaft; and
   an engaged portion formed spirally on a surface of the support shaft in a direction of the axial center so as to be engaged with the engaging portion of each of the plurality of key row holders, the engaged portion causing the plurality of key row holders to shift in the direction of the axial center by an engagement with the engaging portion upon rotation of the support shaft.

* * * * *